E. C. BLOMBERG.
PISTON RING.
APPLICATION FILED JAN. 19, 1916.
1,200,701.
Patented Oct. 10, 1916.
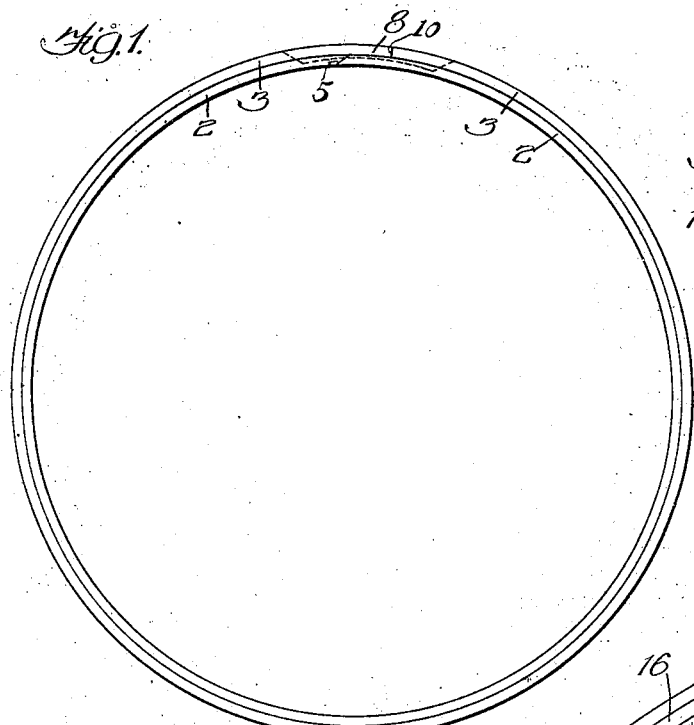
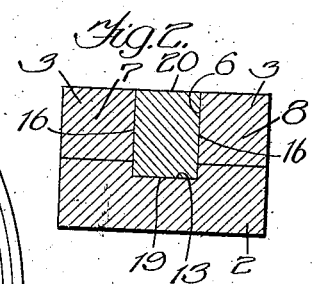
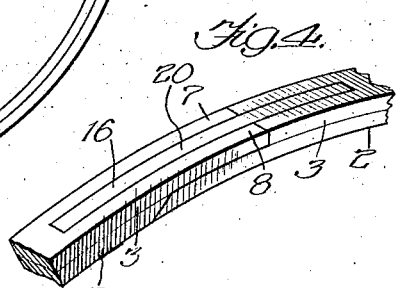
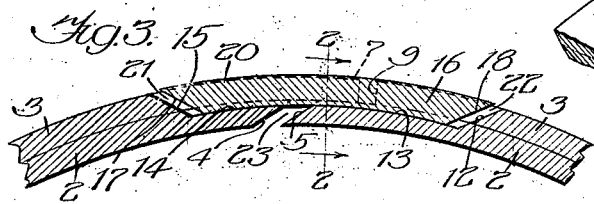
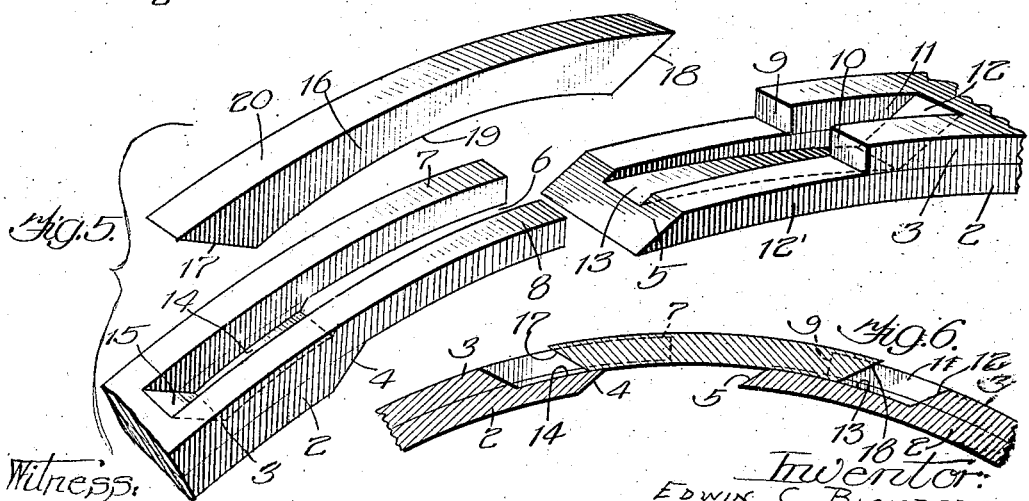
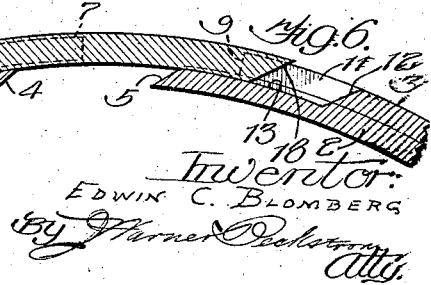
Witness:
Jno. H. Nelson
Inventor:
Edwin C. Blomberg
By Warner Beckstrom
Atty.

UNITED STATES PATENT OFFICE.

EDWIN C. BLOMBERG, OF ROCKFORD, ILLINOIS.

PISTON-RING.

1,200,701.  Specification of Letters Patent.  Patented Oct. 10, 1916.

Application filed January 19, 1916. Serial No. 72,888.

*To all whom it may concern:*

Be it known that I, EDWIN C. BLOMBERG, a citizen of the United States, residing at Rockford, Winnebago county, Illinois, have invented certain new and useful Improvements in Piston-Rings, of which the following is a specification.

My invention relates to improvements in piston ring construction, and has for its object a more fluid tight joint between the ends of piston rings of the type where the joint is formed by letting the ends of the ring into each other. And with this object in view the invention consists in the novel construction, combination and arrangement of parts, all as hereinafter described in detail, illustrated in the accompanying drawing, and incorporated in the appended claims.

In the drawing—Figure 1 is a side elevation of a piston ring composed of two rings welded together and embodying the present improvement. Fig. 2 is a section on line 2—2 of Fig. 3, and enlarged. Fig. 3 is a section of a broken away portion of the ring. Fig. 4 is a perspective view of the parts shown in Fig. 3. Fig. 5 is an enlarged perspective view of the parts shown in Fig. 4 separated. Fig. 6 is a side view of Fig. 4 with the meeting ends of the ring separated to substantially the maximum extent, showing the overlapping insert piece as overlapping the separated ends equally.

In the several views 2 and 3 represent an inner and an outer ring welded together, or otherwise made one, after each has had its ends slotted as shown. The two rings may also be a single ring, although the construction is, perhaps, most conveniently made by having the rings separate until their ends are cut to form the joint.

The essential improvement resides in the present instance in a slot formed on the inner ring portion 2, the bottom of said slot having an arc of curvature that is smaller than the arc of the body of the ring, and in an insert piece, or joint overlapping portion which has a corresponding curvature for its bottom face which makes the radial end cross sections larger than the middle cross section whereby the outer face of the insert piece tends to project beyond the outer face of the body of the ring when the latter is expanded by a wedge-like action which keeps the bottom face of the insert always in close contact with the bottom of the slot in which it is mounted.

The ends of the inner section 2 of the packing ring are beveled as at 4 and 5, the beveled surfaces being parallel and fitting closely when the ring is in its closed position as in Fig. 4. In one end of the outer ring section 3 is a slot or mortise 6, which goes through the outer ring section radially and makes it in the form of a fork with branches 7 and 8. The ends of the latter are cut square to fit against abutments 9 and 10 formed by the opposite end of the outer section 3 by the formation of a slot 11 therein corresponding to, but shorter than, the slot 6, and by a portion 12' which projects the end of the inner section 2 beyond the end 9, 10 of the outer section. The inner end of the slot 11 is beveled as at 12, which beveled portion extends to the bottom of a slot 13 formed in the inner section 2 in one of its ends and continued in a slot 14 in its opposite end, the end of which is a beveled portion or inclined wall 15 like the wall 12 but oppositely inclined.

An insert piece or ring section 16 is fitted into the slots 6, 11, 13 and 14 which has beveled ends 17 and 18 which lie against and parallel, respectively, the surfaces 15 and 12 when the ring is closed as in Figs. 1 and 4. When thus closed the bottom of slots 13 and 14 is curved on a shorter radius than the radius of the inner or outer circle of the ring as a whole. On the insert 16 in Fig. 5 the numeral 19 indicates its curved bottom face. The outer face 20 curvature of the insert 16 corresponds to the arc of curvature of the outer circle of the ring and is represented by the numeral 20. This makes the insert 16 slightly wedge form from each of its ends toward its middle portion as clearly shown in Fig. 5, as well as in Fig. 3, and when the ring is expanded, or its ends are separated, the insert 16 which in Fig. 4 has its outer surface flush with the outer surface of the ring, is forced outwardly as indicated in Fig. 3 and gaps 21 and 22 are formed between the ends 17 and 18 and the beveled faces 15 and 12, these gaps being substantially alike so that substantially the same portion of the insert 16 will be opposite a portion of the insert 16 will be opposite a gap 23 formed between the ends 4 and 5 of the inner ring section 2. In other words this construction prevents all of the gap being formed at one end only of the insert, as at 21 or 22, which, in the case of short overlapping portions 7, 8 and 12', would drag an end of the insert 16 across the gap 23. The expanding movement of the ring thus at all times maintaining the surfaces 13 and 14 in close contact with the surface, or under side 19, the insert portion will maintain a close juncture at said contacting surfaces even when the violent wear and tear on a piston ring makes it otherwise loose and worn.

It has been found that even with mortise-and-tenon joints of the various forms heretofore provided,—that is, the forms which, structurally, have been found commercially practicable,—serious leakages have taken place. Others, while theoretically efficient, have for manufacturers' reasons failed of adoption. In the present invention the short ring section, or insert 16, is designed to accomplish a better joint closure than an insert in the form of a complete ring let into another ring, or as short inserts of prior forms. The relative curvatures of the arcs of respectively the body of the ring and the inner face of the insert and the curved surface it contacts will be correctly figured out for each individual case, especially where the same size of packing ring is to be used for different cylinder diameters.

Having thus described my invention, I claim as new and desire to secure by Letters Patent—

The combination with a packing ring having reduced end portions two of which have beveled meeting edges and the other two square meeting edges, of a slot extending across the lines of junction of the meeting ends of said reduced portions formed in the outer peripheral face of the ring and extending into said reduced portions, and an insert strip in said slot, the bottom of said slot and the inner face of said insert being curved on an arc of shorter radius than the arc of curvature of said ring.

In testimony whereof I have hereunto signed my name.

EDWIN C. BLOMBERG.